US006881453B2

(12) United States Patent
Kido et al.

(10) Patent No.: US 6,881,453 B2
(45) Date of Patent: Apr. 19, 2005

(54) OPTICAL FILM

(75) Inventors: Nobuaki Kido, Iwakuni (JP); Shunichi Matsumura, Iwakuni (JP); Kaoru Iwata, Hachioji (JP); Takashi Kushida, Hino (JP); Akihiko Uchiyama, Hino (JP); Michio Yamaura, Hachioji (JP); Takeshi Sasaki, Iwakuni (JP); Kiyonari Hashidzume, Iwakuni (JP)

(73) Assignees: Teijin Limited, Osaka (JP); Bayer AG, Leverkusen (DE)

( * ) Notice: Subject to any disclaimer, the term of this patent is extended or adjusted under 35 U.S.C. 154(b) by 70 days.

(21) Appl. No.: 10/257,758

(22) PCT Filed: Apr. 23, 2001

(86) PCT No.: PCT/JP01/03455

§ 371 (c)(1),
(2), (4) Date: Oct. 17, 2002

(87) PCT Pub. No.: WO01/81957

PCT Pub. Date: Nov. 1, 2001

(65) Prior Publication Data

US 2003/0138654 A1 Jul. 24, 2003

(30) Foreign Application Priority Data

Apr. 25, 2000 (JP) ........................ 2000-124043
Jun. 8, 2000 (JP) ........................ 2000-171927

(51) Int. Cl.⁷ ............................................. G02F 1/1335
(52) U.S. Cl. .................... 428/1.1; 428/1.3; 428/1.31; 428/64.2; 428/65.5; 349/119; 525/332.8; 525/332.9; 525/333.3
(58) Field of Search ................. 428/1.1, 1.3, 1.31, 428/64.2, 64.3, 65.3, 65.5; 349/117; 525/332.8, 332.9, 333.3

(56) References Cited

U.S. PATENT DOCUMENTS 6,346,578 B1 * 2/2002 Arakawa .................... 525/210
6,433,102 B1 * 8/2002 Suzuki et al. ............. 525/333.3
6,565,974 B1 * 5/2003 Uchiyama et al. .......... 428/412
6,638,582 B1 * 10/2003 Uchiyama et al. .......... 428/1.2

FOREIGN PATENT DOCUMENTS

| JP | 61-024449 A | 2/1986 |
| JP | 63-043910 A | 2/1988 |
| JP | 01-104642 A | 4/1989 |
| JP | 2609139 B2 | 8/1990 |
| JP | 02-285304 A | 11/1990 |
| JP | 04-075001 A | 3/1992 |
| JP | 06-107736 A | 4/1994 |
| JP | 6-107736 | 4/1994 |
| JP | 07-256664 A | 10/1995 |
| JP | 11-302440 A | 11/1999 |
| JP | 11-302440 | 11/1999 |
| JP | 2000-169521 A | 6/2000 |
| JP | 2000-169521 | 6/2000 |
| JP | 2000-212226 | 8/2000 |
| JP | 2000-212226 A | 8/2000 |
| JP | 2001-48924 | 2/2001 |
| JP | 2001-048924 A | 2/2001 |
| WO | WO 99/64501 A1 | 12/1999 |

\* cited by examiner

*Primary Examiner*—Harold Pyon
*Assistant Examiner*—Sow-Fun Hon
(74) *Attorney, Agent, or Firm*—Sughrue Mion, PLLC

(57) ABSTRACT

A film which is a single polymer film and has a smaller phase difference as the wavelength becomes shorter. This film is made from an olefin-based polymer which has an alicyclic group in the side chain, such as hydrogenated polystyrene, the amount of the alicyclic group in the side chain being 60 to 90 wt % based on the whole polymer, and satisfies the following expression:

$$R(450)/R(550) < 1$$

wherein $R(450)$ and $R(550)$ are phase differences on the film plane at a wavelength of 450 nm and a wavelength of 550 nm, respectively.

19 Claims, No Drawings

OPTICAL FILM

This application is a 371 of PCT/JP01/03455 filed Apr. 23, 2001.

FIELD OF THE INVENTION

The present invention relates to a film for optical use. More specifically, it relates to a film for optical use which is used in optical elements such as liquid crystal display devices, glare-proof films, optical recording devices and optical recording media and which has a smaller phase difference as the wavelength becomes shorter within the range of 400 to 700 nm.

PRIOR ART

A phase difference film is used in STN (Super Twisted Nematic) liquid crystal display devices to solve such problems as color compensation and the expansion of view angle. Generally speaking, a phase difference film for color compensation is made from a polycarbonate, polyvinyl alcohol, polysulfone, polyether sulfone or amorphous polyolefin and a phase difference film for the expansion of view angle is made from a polymer liquid crystal or discotic liquid crystal besides the above materials.

A quarter wavelength plate as one of the phase difference films can convert circularly polarized light into linearly polarized light or linearly polarized light into circularly polarized light. This is used in conjunction with a liquid crystal display device, especially a reflection type liquid crystal display device comprising a single polarizing plate with electrodes on the rear side as reflection electrodes when seen from an observer side, an anti-reflection film which is a combination of a polarizing plate and a quarter wavelength plate, or a reflection type polarizing plate which is made from a cholesteric liquid crystal or the like and reflects only clockwise or counterclockwise circularly polarized light.

The phase difference film used in the above reflection type liquid crystal display device comprising a single polarizing plate, or reflection type polarizing plate must have the function of converting linearly polarized light into circularly polarized light or circularly polarized light into linearly polarized light at a wavelength of 400 to 700 nm, preferably 400 to 780 nm which is a visible range. When this function is to be realized with only one phase difference film, the phase difference of the phase difference film is ideally $\lambda/4$ (nm) at a wavelength $\lambda$ of 400 to 700 nm, preferably 400 to 780 nm.

The quarter wavelength plate is generally made from any one of the above materials for the phase difference film for color compensation. These materials have wavelength dispersion in birefringence. Generally speaking, a polymer film exhibits such wavelength dispersion characteristics that the birefringence thereof becomes larger as the wavelength becomes shorter and smaller as the wavelength becomes longer. Therefore, it is difficult to obtain from a single polymer film a phase difference film which has smaller birefringence as the wavelength k becomes shorter within the range of 400 to 700 nm like the above ideal quarter wavelength plate.

As the polymer film whose phase difference becomes smaller as the wavelength becomes shorter within the range of 400 to 700 nm is known a cellulose acetate film (see FIG. 2 of Japanese Patent No. 2609139). However, it is difficult to control the phase difference wavelength dispersion of this cellulose acetate film and to provide a phase difference film (for example, a $\lambda/4$ plate for reflection type liquid crystal display devices) having the optimal phase difference wavelength dispersion which differs according to application purpose by controlling the phase difference wavelength dispersion. The reason for this is that cellulose acetate is a material having a water absorption of about 4 to 10%, which differs according to the degree of acetylation, causing such problems as hydrolysis, dimensional change and orientation relaxation and making it difficult to maintain a phase difference and phase difference wavelength dispersion at practical levels for a long time. That is, these problems depend upon the material itself and a cellulose acetate film has a problem with optical durability and is not appropriate.

A cellulose acetate film which has a phase difference (R(550)) of several nanometers (a water absorption of about 4% and a high degree of acetylation) at a wavelength of 550 nm is generally used as a base substrate for polarizing plates or optical compensation plates. In this application field, even if orientation relaxation occurs at R(550), no practical problem arises, thereby making it possible to use this film as a phase difference film. However, when R(550) is larger than several nanometers, it is extremely difficult to obtain a highly reliable phase difference film from a cellulose acetate film. For use in the inside of a car where high heat resistance and high humidity resistance are required, higher reliability has been required.

Further, to obtain a film having smaller birefringence as the wavelength becomes shorter like an ideal quarter wavelength plate, JP-A 10-68816 (the term "JP-A" as used herein means an "unexamined published Japanese patent application") discloses a technology for laminating together a quarter wavelength plate and a half wavelength plate at an appropriate angle and JP-A 2-285304 discloses a technology for laminating together two phase difference films having different Abbe's numbers.

To obtain a film having birefringence wavelength dispersion characteristics like the above ideal quarter wavelength plate, two films must be used in the current state of the art. In this case, there are such problems as the addition of a film lamination step and increases in costs and optical design load.

Optical recording media which make use of a laser are capable of high-density information recording, storage and reproduction and various recording media have been implemented. Out of these, high-capacity digital versatile disks (DVD) have recently been implemented in place of conventional CDs and various DVD's for different application purposes have been developed. In order to increase the recording density of information, attempts have been made to shorten the wavelength of laser light and use a lens having a large numerical aperture. For instance, Nikkei Electronics No. 749, pp. 47, Aug. 9, 1999 introduces technologies for reducing the thickness of a layer through which laser light passes, for example, cover layers having a thickness of 0.3 to 0.1 mm through which laser light passes and lenses used for the cover layers, which have a numerical aperture of 0.70 to 0.85. Problems to be solved for increasing the recording density are growing birefringence at a short wavelength and an increase in the numerical aperture of an optical system. Generally speaking, birefringence grows as the wavelength becomes shorter as will be described hereinafter and increasing the recording density by shortening the wavelength of laser light induces growing birefringence. It is preferred to use a lens having a large numerical aperture so as to increase the recording density but it is expected that this will have a great influence upon not only birefringence on the plane of the film but also birefringence in the thickness direction of the film. An optical film effective in solving the problems as a cover layer is desired.

For example, JP-A 10-320833 and JP-A 11-7658 disclose an optical recording medium having the above cover layer and a production process therefor. JP-A 2000-3615 discloses a multi-layer recording film. Although it is disclosed that a plastic sheet such as a polycarbonate or amorphous polyolefin sheet is used as the cover layer, there are few descriptions of the actually used materials.

Meanwhile, polycarbonate resins and polymethyl methacrylate resins have been used as a material for optical disk substrates because they are excellent as an optical material. As polycarbonate resins are particularly excellent in transparency, heat resistant stability and toughness, they have been widely used as a disk material. For instance, JP-A 7-256664 discloses a film which is excellent in optical isotropy and a process for producing a polycarbonate film having a refractive index difference on the plane of 0.00004 and a difference between refractive index on the plane and refractive index in a direction normal to the plane of 0.0005 as an example.

However, optical anisotropy readily occurs in the polycarbonate resins due to large intrinsic birefringence as they contain an aromatic ring in the molecule. It is difficult to form a film having a small difference between refractive index on the plane and refractive index in the direction normal to the plane even from the above film. Since polymethyl methacrylates have an extremely high water absorption, they have poor dimensional stability and yet low heat resistance. Therefore, it cannot be said that these raw materials are satisfactory as a material for the above cover layer type optical recording media.

As a polyolefin having an alicyclic group in the side chain is a resin having excellent heat resistance and optical properties, the application of the resin in optical parts such as optical disks and pick-up lenses is proposed. As the polyolefin is known a hydrogenated polystyrene-based resin which can be produced by hydrogenating a polystyrene-based resin. JP-A 63-43910 discloses that hydrogenated polystyrene obtained by hydrogenating the aromatic ring of polystyrene is used in optical disks. Also JP-A 4-75001 discloses a plastic lens which is molded from a molding material produced by nuclear hydrogenating a polymer of an aromatic vinyl compound.

As for use of a hydrogenated polystyrene-based resin as a film material, JP-A 61-24449 discloses use of a hydrogenated polystyrene-based resin as a modifier for polypropylene-based resin films and JP-A 1-104642 also discloses use of a hydrogenated polystyrene-based resin as a modifier for styrene-based resin films. However, all of them are utterly silent about the dependence on wavelength of the birefringence of a film made from a hydrogenated polystyrene-based polymer.

WO 99/64501 discloses an elastic film having at least one layer made from (A) at least one substantially random interpolymer which comprises (1) a polymer unit derived from (i) at least one vinyl aromatic monomer, (ii) at least one aliphatic or alicyclic vinyl or vinylidene monomer or (iii) a combination of (i) and (ii) and (2) a polymer unit derived from ethylene, at least one α-olefin having 3 to 20 carbon atoms or a combination thereof and optionally (3) a polymer unit derived from an ethylenically unsaturated polymerizable monomer different from the monomers of (1) and (2), or from (B) a blend of at least one polymer different from the component (A) and the component (A), and a recovery factor in a sectional direction of 80% or more and a recovery factor in a mechanical axis direction of 60% or more. It is also disclosed that this elastic film is used for packaging.

SUMMARY OF THE INVENTION

It is an object of the present invention to provide a film which is a single polymer film and has a smaller phase difference as the wavelength becomes shorter.

It is another object of the present invention to provide a phase difference film which is a single polymer film and has a smaller phase difference as the wavelength becomes shorter and a film useful as a cover layer for information recording media.

Other objects and advantages of the present invention will become apparent from the following description.

According to the present invention, the above objects and advantages of the present invention are attained by a film which comprises a polymer having such a structure that the main chain thereof comprises a hydrocarbon skeleton and some of the hydrogen atoms of the hydrocarbon skeleton are substituted by at least one alicyclic group selected from the group consisting of an alicyclic hydrocarbon group having a 4 or more membered ring and an alicyclic heterocyclic group, the amount of the alicyclic group being 60 to 90 wt %, and which satisfies the following formula (A):

$$R(450)/R(550) < 1 \tag{A}$$

wherein R(450) and R(550) are phase differences on the film plane at a wavelength of 450 nm and a wavelength of 550 nm, respectively.

DETAILED DESCRIPTION OF THE PREFERRED EMBODIMENTS

The film of the present invention satisfies the above formula (A).

The above formula (A) shows that the phase difference becomes smaller as the wavelength becomes shorter, typified by phase differences at a wavelength of 450 nm and a wavelength of 550 nm. Widening the wavelength range, R(650)/R(550)>1 is preferred. A more preferred range of phase difference dispersion will be described later.

It is known that the phase difference (retardation) of a polymer film is caused by the optical anisotropy of a polymer constituting the film and expressed by the product $\Delta n \cdot d$ of the thickness d of the film and a phase difference $\Delta n$ based on a difference in the phase traveling speed of light between the direction of the maximum refractive index on the film plane and a direction perpendicular to the above direction (direction of the minimum refractive index) when light transmits the film having a thickness d.

This optical anisotropy is caused by the orientation of a polymer at the time of melt extrusion, orientation on the plane at the time of casting a film and orientation by uniaxial or biaxial stretching.

The dependence on wavelength of phase difference is caused by the dependence on wavelength of refractive index difference and the refractive index difference generally becomes larger as the wavelength becomes shorter. This can be understood from the fact that the refractive index increases in a direction of the transition moment of absorption as the wavelength becomes closer to the absorption range of light. Therefore, it is generally extremely difficult to form a film which satisfies the above formula (A). For example, $\Delta n(450)/\Delta n(550)$ of a polycarbonate obtained by polymerizing bisphenol A and phosgene is about 1.08 and that of a polyvinyl alcohol which is said to have small birefringence wavelength dispersion is about 1.01.

The film of the present invention is made from a polymer having such a structure that the main chain thereof is composed of a hydrocarbon skeleton and some of the hydrogen atoms of the hydrocarbon skeleton are substituted by at least one alicyclic group selected from the group of an alicyclic hydrocarbon group having a 4 or more membered ring and an alicyclic heterocyclic group, the amount of the alicyclic group being 60 to 90 wt %.

Examples of the alicyclic hydrocarbon group having a 4 or more membered ring include cyclobutyl group, cyclopentyl group, cyclohexyl group, cycloheptyl group and a group represented by the following formula.

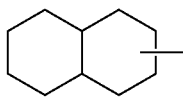

Out of these, alicyclic hydrocarbon groups having a 4 to 7 membered ring are preferred and alicyclic hydrocarbon groups having a 6 membered ring are particularly preferred.

Examples of the alicyclic heterocyclic group having a 4 or more membered ring include what are obtained by substituting 1 to 3 carbon atoms of the ring members of the above alicyclic hydrocarbon groups by an oxygen atom, nitrogen atom or sulfur atom. Out of these, alicyclic heterocyclic groups having a 4 to 7 membered ring are preferred.

The above alicyclic hydrocarbon group and alicyclic heterocyclic group may have a substituent having 1 to 6 carbon atoms, such as methyl or ethyl.

The alicyclic group having a 4 or more membered ring forming the side chain is contained in an amount of 60 to 90 wt % based on the whole polymer. This indicates the weight fraction of the alicyclic group based on the whole polymer and can be calculated from the molar ratio of constituent elements obtained by a spectroscopic technique such as NMR.

It is considered that a phase difference derived from the alicyclic structure of the side chain and a phase difference derived from the hydrocarbon skeleton of the main chain offset each other by the orientation of the polymer having an alicyclic group in the side chain used in the present invention. It is also considered that the absolute value of the phase difference derived from the alicyclic structure is larger than the absolute value of the phase difference derived from the main chain and that the above formula (A) is established when orientation becomes such that the dependence on wavelength of the phase difference derived from the side chain becomes smaller than the dependence on wavelength of the phase difference derived from the main chain.

Therefore, to obtain the film of the present invention, the weight fraction of the alicyclic group constituting the side chain of the polymer and the orientation of the film are extremely important. When the amount of the alicyclic group is smaller than 60 wt % based on the whole polymer, it is difficult to satisfy the above formula (A). The glass transition temperature lowers and the heat resistance deteriorates disadvantageously. When the amount of the alicyclic group is larger than 90 wt % based on the whole polymer, the proportion of the main chain composed of the hydrocarbon skeleton becomes too small, thereby making it difficult to satisfy the above formula (A). It is also difficult to obtain a polymer having sufficiently high strength for practical use. As for the weight fraction of the alicyclic group, the lower limit is preferably 62 wt %, more preferably 65 wt % and the upper limit is preferably 85 wt %, more preferably 80 wt %.

For the same reason, preferably 8 to 50 mol % of the total number of hydrogen atoms of the hydrocarbon skeleton of the main chain of the polymer are substituted by an alicyclic group. The lower limit is more preferably 10 mol %, particularly preferably 13 mol % and the upper limit is more preferably 40 mol %, particularly preferably 35 mol %.

After a polymer having controlled tacticity is produced by the method described hereinafter, the phase difference thereof can be controlled by hydrogenation. For example, the stereostructure of an ordinary polystyrene-based polymer hydrogenated product is atactic in most cases. The phase difference can be controlled by making the alicyclic hydrocarbon group or alicyclic heterocyclic group mainly syndiotactic or isotactic. PCT 98/07977 and PCT 00/01027 disclose methods of producing syndiotactic hydrogenated polystyrene (74%≧r≧50.1%) and isotactic hydrogenated polystyrene (74%≧r≧50.1%), respectively.

An example of the method of producing a polystyrene-based polymer having an isotactic structure is one in which styrene and optionally a conjugated diene are polymerized in the presence of an anion polymerization initiator and a potassium alkoxide.

The anion polymerization initiator is an organic metal compound having the group 1 or 2 metal of the periodic table. Illustrative examples of the anion polymerization initiator include lithium, sodium, potassium, rubidium, cesium, francium, magnesium, calcium, strontium, barium, radium, methyllithium, ethyllithium, n-propyllithium, iso-propyllithium, n-butyllithium, iso-butyllithium, sec-butyllithium, cyclopentadienyllithium, phenyllithium, cyclohexyllithium, methylsodium, ethylsodium, n-propylsodium, iso-propylsodium, n-butylsodium, cyclopentadienylsodium, dimethylmagnesium, dibutylmagnesium, bis(cyclopentadienyl)magnesium, dimethylcalcium and bis(cyclopentadienyl)calcium. Out of these, organic lithium compounds and organic magnesium compounds are preferred and n-butyllithium, sec-butyllithium and dibutylmagnesium are particularly preferred from the viewpoints of acquisition ease and manipulation ease. They may be used alone or in combination of two or more.

An electron donor compound may be added to further activate the above initiator, improve the reaction speed, increase the molecular weight and present anions from deactivating. The electron donor compound is a compound which can provide electrons to the metal of an initiator without impairing the function of the initiator and which contains an oxygen atom, nitrogen atom, sulfur atom or phosphorus atom. Illustrative examples of the electron donor compound include ethers such as furan, tetrahydrofuran, diethyl ether, anisole, diphenyl ether, methyl-t-butyl ether, dioxane, dioxolan, dimethoxyethane and diethoxyethane; tertiary amines such as trimethylamine, triethylamine, tributylamine, tetramethyl methylenediamine, tetramethyl ethylenediamine, tetraethyl methylenediamine, tetraethyl ethylenediamine, tetramethyl 1,3-propanediamine, tetramethyl phenylenediamine and diazabicyclo[2.2.2]octane; thioethers such as dimethyl sulfide, thiophene and tetrahydrothiophene; and tertiary phosphines such as trimethylphosphine, triethylphosphine, tri-n-butylphosphine, triphenylphosphine, dimethyl phosphinomethane, dimethyl phosphinoethane, dimethyl phosphinopropane, diphenyl phosphinomethane, diphenyl phosphinoethane and diphenyl phosphinopropane. Out of these, tetrahydrofuran, dimethoxyethane, tetramethyl ethylenediamine and diazabicyclo[2.2.2]octane are particularly preferred. They may be used alone or in combination of two or more.

The amount of the electron donor compound, which differs according to the types of the initiator and the electron donor compound, is 0.1 to 100 mol, preferably 0.2 to 50 mol, more preferably 0.3 to 10 mol based on 1 mol of the initiator. When the amount is too small, the activation effect is not obtained and when the amount is too large, the activation effect does not increase further and the electron donor compound is wasted disadvantageously. This is not applied when the electron donor compound is used as a solvent.

In the above method, the anion polymerization initiator and the potassium alkoxide are used in combination. The potassium alkoxide is not particularly limited if it comprises a potassium ion and alkoxide. Preferred examples of the potassium alkoxide include potassium methoxide, potassium ethoxide, potassium-n-propoxide, potassium-isopropoxide, potassium-n-butoxide, potassium-sec-butoxide, potassium-t-butoxide, potassium-2-methyl-2-butoxide, potassium-1-adamantoxide, potassium-2-adamantoxide and potassium phenoxide. Out of these, potassium-t-butoxide and potassium-2-methyl-2-butoxide are preferred and potassium-t-butoxide is more preferred because isotactic polystyrene can be produced with a small amount thereof.

The amount of the potassium alkoxide, which differs according to the types of the anion polymerization initiator and the potassium alkoxide, is 0.1 to 100 mol, preferably 0.2 to 50 mol, more preferably 0.3 to 10 mol based on 1 mol of the initiator. When the amount is too small, a stereostructure control effect is not obtained and when the amount is too large, the effect does not increase further and the potassium alkoxide is wasted disadvantageously. In the present invention, the isotactic degree can be controlled by the molar ratio of the anion polymerization initiator to the potassium alkoxide.

In the above method, styrene and optionally a conjugated diene are polymerized in the presence of the above anion polymerization initiator and the above potassium alkoxide. Examples of the conjugated diene include cyclic conjugated dienes such as 1,3-cyclopentadiene, 1,3-cyclohexadiene, 1,3-cycloheptadiene, 1,3-cyclooctadiene and derivatives thereof; and chain conjugated dienes such as 1,3-butadiene, isoprene, 1,3-pentadiene, 1,3-hexadiene and 2,3-dimethyl-1,3-butadiene. Out of these, butadiene and isoprene are preferred as they have high reactivity and are easily acquired, and isoprene is more preferred. They may be used alone or in combination of two or more. The effect of improving toughness can be expected from the addition of a conjugated diene. The amount of the conjugated diene is not particularly limited but it is preferably 0 to 30 wt %, more preferably 0 to 25 wt %, more preferably 0 to 20 wt % based on styrene. When the amount of the conjugated diene is larger than 30 wt %, the effect of improving toughness is large but the thermal deformation temperature lowers disadvantageously. In the present invention, both styrene and conjugated diene have high reactivity and can be converted into a polymer almost quantitatively.

The isotactic dyad can be obtained by analyzing the nuclear magnetic resonance spectrum thereof in accordance with Maclomol. Chem., vol. 156, pp. 256, 1972 of Inoue et al.

The thus obtained styrene polymer is hydrogenated to obtain a raw material for the film of the present invention.

The film of the present invention is a film which satisfies the above formula (A). This property is based on the composition of the above polymer but can be obtained by the orientation of the residue at the time of molding and the uniaxial or biaxial orientation of the film. The orientation method will be detailed hereinafter.

As for the preferred range of phase difference dispersion satisfying the formula (A) of the film of the present invention, the birefringence Δn of the phase difference film is preferably larger as the wavelength is longer, more specifically the phase difference film satisfies the following expressions (A)-1 and (A)-2:

$$0.60 < R(450)/R(550) < 0.97 \tag{A-1}$$

$$1.01 < R(650)/R(550) < 1.35 \tag{A-2}$$

When the phase difference film is outside the above range, for example, when it is used as a λ/4 plate, there may arise such a problem that if linearly polarized light having a wavelength of 400 to 700 nm is input into this film, perfect circularly polarized light is obtained at a specific wavelength but imperfect circularly polarized light is obtained at a wavelength other than the above wavelength. More preferably, the phase difference film satisfies the following expressions (A)-1' and (A)-2':

$$0.60 < R(450)/R(550) < 0.95 \tag{A-1'}$$

$$1.05 < R(650)/R(550) < 1.35 \tag{A-2'}$$

The above description is given of a phase difference film having a preferred phase difference Δn·d or phase difference on the film plane based on birefringence Δn. The same development is made based on the K value of 3-D refractive index ($K=[nz-(nx+ny)/2]\times d$). When the phase differences and K values of the film at wavelengths of 450, 550 and 650 nm are represented by R(450), R(550), R(650), K(450), K(550) and K(650), respectively, and the K values satisfy the expression (B): K(450)/K(550)<1, the wavelength dispersion becomes smaller as the wavelength becomes shorter like the phase difference (birefringence) of light coming from an inclination direction which is not perpendicular to the film plane.

The K values preferably satisfy the following expressions (B)-1 and (B)-2:

$$0.60 < K(450)/K(550) < 0.97 \tag{B-1}$$

$$1.01 < K(650)/K(550) < 1.35 \tag{B-2}$$

more preferably the following expressions (B)-1' and (B)-2':

$$0.60 < K(450)/K(550) < 0.95 \tag{B-1'}$$

$$1.05 < K(650)/K(550) < 1.35 \tag{B-2'}$$

The K value is an index of 3-D anisotropy in the refractive index of a phase difference film and changes by an R value and film thickness, and the optimal K value differs according to application purpose.

A quarter wavelength plate (λ/4 plate) or a half wavelength plate (λ/2 plate) which rarely depends on wavelength can be constructed by a single film of the present invention. For this application, preferably $R(550) \geq =50$ nm, more preferably $R(550) \geq 90$ nm. When the film of the present invention is used as a λ/4 plate, preferably 100 nm$\leq R(550) \leq$180 nm and when the film of the present invention is used as a λ/2 plate, preferably $220 \leq R(550) \leq 330$ nm.

Preferably, the phase differences at a wavelength of 450 nm and a wavelength of 550 nm of the film of the present invention satisfy the above formula (1) and R(550) is 50 nm or more.

When the film of the present invention is used as a cover layer for information recording media, the phase difference R(550) at a wavelength of 550 nm of the film is preferably 30 nm or less. Since the film of the present invention satisfies the expression (A), it has a smaller phase difference at 400 nm, which is preferred as a cover layer when a short wavelength laser is used. When R(550) is larger than 30 nm, the absolute value of birefringence is large, which is not preferred for the above application. The value of R(550) is preferably smaller, more preferably 20 nm or less, much more preferably 15 nm or less, particularly preferably 10 nm or less.

The film of the present invention preferably has a light transmission at 400 nm of 85% or more. The transmission at 400 nm is important for reading and writing of information with a blue laser, which is expected in the future. When the light transmission at 400 nm is lower than 85%, the loss of blue laser light is large disadvantageously. The light transmission is preferably higher, more preferably 87% or more, much more preferably 88% or more.

The film of the present invention is characterized in that the refractive index difference at a wavelength of 550 nm between any direction on the plane and a direction normal to the plane is 0.0005 or less. This is important when the numerical aperture of an objective lens is large. The refractive index difference becomes smaller as optical isotropy becomes higher advantageously. The refractive index difference between any direction on the plane and the direction normal to the plane is more preferably 0.0003 or less, much more preferably 0.0001 or less.

The film of the present invention is advantageously used as a cover layer for information recording media and preferably has a thickness of 3 to 177 μm. There is a description of the reason that this range is preferred in the above-mentioned JP-A 11-7658.

Although the film of the present invention may be used even when it is rarely oriented, it is preferably a film which is oriented in at least one direction and has an elongation of 1% or more in at least one direction and a shrinkage factor of more than 1% at a glass transition temperature measured in a film state when the film is not tough without orientation. An optical film having an elongation of 1% or more can be obtained by stretching a film in at least one direction. The word "oriented" is considered as a state where the molecular chain of a polymer is elongated from a thermal equilibrium state and the existence of this orientation can be detected either as shrinkage or shrinkage stress at the time of a heat treatment at a temperature higher than the glass transition temperature, or as refractive index difference between an orientation direction and an non-orientation direction, or retardation. The existence of orientation can be detected by freely shrinking a film at a temperature higher than the glass transition temperature in the heat treatment.

The film of the present invention preferably has an elongation measured in a film state of more than 1%. The elongation of the film is preferably high in terms of toughness. To obtain a film having an elongation of more than 1%, the film is easily obtained from a hydrogenated polystyrene-based polymer which is copolymerized with a hydrogenated product of a conjugated diene polymer. In the case of a copolymer, even when orientation is not carried out, a film having an elongation of more than 1% can be obtained. However, to obtain a film having a higher elongation and higher toughness, an oriented copolymer is advantageous. When a hydrogenated product of a conjugated diene polymer is not copolymerized, to obtain a film having high elongation and toughness, the film is preferably oriented by the method which will be described later. The elongation of the film is more preferably 1.5% or more, much more preferably 2% or more.

The orientation of the film can be detected by measuring refractive indexes in two directions on the plane of the film and a direction normal to the plane of the film. The film of the present invention is characterized in that although it is oriented, optical isotropy thereof is extremely high surprisingly. Therefore, high accuracy measurement is required for the detection of a refractive index difference. The refractive index difference between any direction on the plane of the hydrogenated polystyrene-based resin film of the present invention and a direction normal to the plane is 0.0005 or less, or 0.00005 or more in terms of orientation. There is a case where the detection of orientation from the refractive index difference is impossible because optical isotropy is increased by composition or copolymerization type in the case of a copolymer. However, in the case of a hydrogenated polystyrene-based resin film which does not contain a diene component, when the refractive index difference between two directions on the plane is 0.00005 or more, the film may be regarded as oriented. Further, it is possible to judge orientation from a shrinkage factor at a temperature near the glass transition temperature. The hydrogenated polystyrene-based film of the present invention which shows a shrinkage factor of 1% or more by a heat treatment at the glass transition point thereof is preferred in terms of strength. As orientation becomes larger as the shrinkage factor increases, a film having a large shrinkage factor has high strength. However, when the shrinkage factor is too large, it causes thermal deformation at the time of reading and writing information making use of laser light. The shrinkage factor at the time of a heat treatment, which changes by copolymerization, is preferably 1.5 or more and less than 50%, more preferably 2% or more and less than 40%, much more preferably 2% or more and less than 25%.

The polymer used in the film of the present invention is preferably a copolymer consisting of a recurring unit represented by the following formula (1):

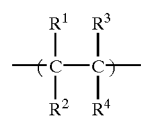

(1)

wherein $R^1$, $R^2$, $R^3$ and $R^4$ are the same or different and each a hydrogen atom, aliphatic group having 1 to 10 carbon atoms or alicyclic group having a 4 or more membered ring, with the proviso that at least one of $R^1$, $R^2$, $R^3$ and $R^4$ is an alicyclic group having a 4 or more membered ring, and a recurring unit represented by the following formula (2):

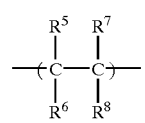

(2)

wherein $R^5$, $R^6$, $R^7$ and $R^8$ are the same or different and each a hydrogen atom, aliphatic group having 1 to 10 carbon atoms or aromatic group having 6 to 12 carbon atoms.

Each of the above recurring units (1) and (2) may be block copolymerized or random copolymerized.

The recurring unit (1) is a constituent component having an alicyclic group in the side chain and the recurring unit (2) is a constituent component having no alicyclic group in the side chain. As described above, also in this case, the alicyclic group having a 4 or more membered ring is preferably contained in an amount of 60 to 90 wt % based on the whole polymer. As for the amounts of the recurring units copolymerized, the recurring unit (1) is preferably contained in an amount of at least 80 mol % based on total of the recurring unit (1) and the recurring unit (2) to obtain the film of the present invention. The definition of the alicyclic group is the same as described above.

Similarly, the polymer used in the film of the present invention is also preferably a polymer consisting of a recurring unit represented by the above formula (1).

Illustrative examples of the polymer in the present invention are a hydrogenated product of a styrene polymer and a hydrogenated product of a styrene copolymer.

The hydrogenated product of a styrene polymer is obtained by hydrogenating the phenylene group of the styrene polymer at a hydrogenation factor of 90 mol % or more. The styrene polymer to be hydrogenated is obtained by polymerizing one or more styrene monomers such as styrene, α-methylstyrene, 4-methylstyrene and 2-methylstyrene. A hydrogenated product having a hydrogenation factor of the phenylene group as an aromatic ring of 90 mol % or more obtained by hydrogenating a styrene polymer consisting essentially of styrene as a styrene monomer is preferred in terms of the physical properties of a polymer after hydrogenation and cost. For example, in the case of hydrogenated polystyrene obtained by 100% hydrogenating polystyrene, the cyclohexane ring in the side chain is contained in an amount of approximately 75 wt % based on the polymer.

The hydrogenated product of a styrene copolymer is obtained by hydrogenating a styrene copolymer prepared by polymerizing the above styrene monomer and another monomer as monomers. A component derived from the another monomer contained in the hydrogenated product of the copolymer corresponds to the recurring unit represented by the above formula (2). Illustrative examples of the another monomer include diene monomers such as isoprene, 1,3-butadiene, 2,3-dimethyl-1,3-butadiene, 1,3-pentadiene and 1,3-hexadiene, and olefins such as ethylene, propylene and 2-methylpentene. When a diene monomer is used, a polymerization reaction occurs at the 1- and 2-positions of a diene or the 1- and 4-positions of the diene. When the reaction occurs at the 1- and 4-positions, a unit consisting of two continuous recurring units represented by the above formula (2) is formed from one monomer unit. Out of the another monomer components to be copolymerized, isoprene, 1,3-butadiene, ethylene and propylene are preferred from an economical point of view. They may be used alone or in combination of two or more. When an olefin monomer is used, random copolymerization methods are disclosed by EP-A-0416815, U.S. Pat. No. 5,703,187, WO 99/64501 (p. 14, 1.22~) and the like.

The hydrogenated product of a styrene copolymer is preferably a hydrogenated product of a block copolymer consisting of a (styrene polymer) block and a (polyconjugated diene) block.

The amount of another monomer to be copolymerized in the styrene copolymer is 20 wt % or less based on the whole copolymer after hydrogenation. The another monomers may be used alone or in combination of two or more. The amount of the diene monomer to be copolymerized is more preferably 15 wt % or less after hydrogenation.

Further, the styrene polymer used in the present invention preferably has a hydrogenation factor of 90% or more as described above. The component not hydrogenated is regarded as a component represented by the above formula (2).

When the hydrogenated product of a styrene polymer is used in the present invention, it preferably has a reduced viscosity (concentration of 0.5 g/dL, in toluene, at 30° C.) of 0.3 or more from the viewpoint of the toughness of a molded product thereof. The reduced viscosity is more preferably 0.35 or more, much more preferably 0.37 or more.

As for the method of polymerizing a styrene polymer, a polymer consisting of a styrene monomer, such as polystyrene, can be produced by conventionally known radical polymerization or anion polymerization. A styrene-conjugated diene block copolymer can be produced by known anion polymerization in the presence of organic lithium as an initiator.

The styrene copolymer having a linear structure without a branch preferably has such a structure that the (polyconjugated diene) block component (b) is sandwiched between (styrene polymer) blocks (a) (a-b-a structure) so as to retain transparency. This is because phase separation easily occurs at a wavelength below the size of light in this structure. To produce a copolymer having a linear structure, conventionally known production processes may be employed. For instance, the copolymer can be produced by carrying out living anion polymerization on the styrene polymer (a), polyconjugated diene component (b) and styrene polymer (a) in the mentioned order, terminating the reaction, and carrying out a hydrogenation reaction. To improve mechanical properties such as impact resistance, a large amount of the conjugated diene component is preferably used but when the amount is too large, agglomeration and crystallization readily occur, thereby reducing transparency and heat resistance disadvantageously.

The film of the present invention is preferably transparent with a haze value of 3% or less and a total light transmission of 87% or more, preferably 88% or more, particularly preferably 89% or more. Further, when the film of the present invention is used as a cover layer (protective film) for information recording media, it preferably has a transmission at 400 nm of 85% or more.

The film of the present invention has an elongation at 25° C. of 50% or less, preferably 1 to 50%. When the film has a high elongation, it has a low elastic modulus and becomes inferior in rigidity if it is used as a film for optical use which the present invention is directed to.

The thickness of the film of the present invention, which differs according to application purpose, is preferably 1 to 400 μm, more preferably 3 to 300 μm.

Further, the film of the present invention can achieve a water absorption of 0.1 wt % or less for practical use and is characterized by this.

The film of the present invention can be produced with conventionally known film forming equipment and stretching equipment. A preferred example of the production of the film of the present invention will be detailed, taking a case where a hydrogenated product of a styrene polymer is used as the polymer.

To produce a film from the hydrogenated product of a styrene polymer, for example, (A) a process in which a cast film is formed from a solution of the hydrogenated product and (B) a process in which a film is formed from the hydrogenated product in a molten state are employed. The films obtained by these processes are stretched according to application purpose.

The process (A) comprises the steps of dissolving the hydrogenated product of a styrene polymer in a solvent for dissolving the hydrogenated product, forming a film by casting and removing the solvent. The concentration of the hydrogenated polymer solution used for casting, which differs according to the polymerization degree of the polymer, is about 10 to 40 wt %. When stretching is then carried out, it may be carried out (A1) after the solvent contained in the film has been removed or (A2) while a trace amount of the solvent remains in the film.

The solvent used for casting is not limited to a particular kind if it dissolves the hydrogenated product of a styrene polymer and has a boiling point of 200° C. or less. For example, when hydrogenated polystyrene is used as the hydrogenated product of a styrene polymer, hydrocarbon-based solvents such as cyclohexane, toluene and chlorobenzene, and halogenated hydrocarbon-based solvents may be used. In the case of (A1), a solvent having a boiling point lower than the glass transition temperature of the hydrogenated polymer is preferably used because it can be removed before stretching. For example, when hydrogenated polystyrene is used, cyclohexane, toluene and chlorobenzene can be advantageously used as they have a boiling point lower than 150° C. which is the glass transition temperature of hydrogenated polystyrene at normal pressure.

When the film is to be formed by casing in (Al) and stretched after the solvent has been substantially removed, the film is stretched at an area draw ratio of at least 1.5 times at a temperature of (the glass transition temperature of the hydrogenated polymer−50)° C. to (glass transition temperature of the hydrogenated polymer+40)° C. The film may be stretched in only a uniaxial direction, uniaxial direction and then a direction perpendicular to that direction sequentially, or two directions simultaneously. To achieve a large phase difference, the film is preferably stretched in only a uniaxial direction.

When the stretching temperature of the film is lower than (the glass transition temperature of the hydrogenated polymer−50)° C., it is difficult to stretch the film, the film may be broken by stretching, or stretching takes a long time if stretching is possible. When the stretching temperature is higher than (glass transition temperature of the hydrogenated polymer+40)° C., the film flows, the effect of stretching cannot be obtained, and it is difficult to obtain a film having uniform thickness. The stretching temperature greatly differs according to the polymerization degree, composition and structure of the polymer used. Further, to obtain a film having a large phase difference, the stretching temperature is preferably lower within the above range, more preferably (glass transition temperature of the hydrogenated polymer+10)° C. or less. To obtain a film having a large phase difference, the stretching temperature is more preferably (glass transition temperature of the hydrogenated polymer−30)° C. to (glass transition temperature of the hydrogenated polymer+5)° C.

The draw ratio is preferably 1.5 times or more in terms of area draw ratio. When the draw ratio is lower than 1.5 times, orientation is not sufficient, and the obtained film is unsatisfactory in terms of strength and is easily broken by bending slightly. The upper limit of draw ratio which differs according to stretchability, the allowable range of birefringence and equipment used is about 100 times. In consideration of required thickness and strength, the draw ratio is preferably 2 to 20 times in terms of area draw ratio. The film is stretched at least in a uniaxial direction at an area draw ratio of 1.5 times or more. The area draw ratio which is slightly changed by the stretching method is preferably more than 1.5 times in the case of uniaxial stretching.

When the film is to be formed by casing in (A2) and stretched while the solvent remains in the film, the film is stretched at an area draw ratio of at least 1.5 times at a temperature of (glass transition temperature−50)° C. to (glass transition temperature+10)° C. while the film produced by casting contains the solvent. Most of the residual solvent is removed during stretching. When the stretching temperature is lower than (the glass transition temperature of the film containing the solvent−50)° C., it is difficult to stretch the film, the film may be broken by stretching, or stretching takes a long time if stretching is possible. When the stretching temperature is higher than (glass transition temperature+10)° C., the film flows and it is difficult to obtain a satisfactory film because air bubbles are formed by the residual solvent. The preferred stretching temperature differs according to the polymerization degree, composition and structure of the polymer used. The stretching temperature is more preferably (the glass transition temperature of the film containing the solvent−30)° C. to (glass transition temperature of the film containing the solvent+5)° C. The draw ratio is the same as in (A1).

When the film is to be formed from a hydrogenated product of a styrene polymer (B) in a molten state and stretched under heating, the hydrogenated product is melt extruded at (the glass transition temperature of the hydrogenated product+50)° C. to (glass transition temperature of the hydrogenated product+200)° C. and solidified by quenching at (glass transition temperature of the hydrogenated product−40)° C. to (glass transition temperature of the hydrogenated product+60)° C. The melting temperature greatly differs according to the polymerization degree of the hydrogenated polymer. It is preferably a temperature at which the melt viscosity of the hydrogenated product becomes about 100 to 10,000 poise at a shear rate of 1,000 (1/s). When the melt viscosity is 100 poise or less, it is difficult to form a uniform film and when the melt viscosity is 10,000 poise or more, the load at the time of extrusion becomes large disadvantageously. The preferred melt viscosity ranges from about 200 to 5,000 poise. Owing to these, it is difficult to obtain appropriate viscosity for film formation when the melting temperature is (the glass transition temperature of the hydrogenated polymer+50)° C. or less. At (glass transition temperature of the hydrogenated product+200)° C. or more, the stability of the polymer at the time of residence becomes poor disadvantageously. The melting temperature is preferably (the glass transition temperature of the polymer+70)° C. to (glass transition temperature of the polymer+180)° C., more preferably (the glass transition temperature of the polymer+80)° C. to (glass transition temperature of the polymer+170)° C. Further, the temperature for cooling the molten material is (glass transition temperature of the polymer−40)° C. to (glass transition temperature of the polymer+60)° C. When the temperature for cooling the molten material to be solidified is lower than (glass transition temperature of the polymer−40)° C., it is difficult to obtain a film having a smooth surface and when the temperature is higher than (glass transition temperature of the polymer+60)° C., the formed film has an insufficient elastic modulus and is therefore deformed easily as cooling is not enough. The cooling temperature is preferably (glass transition temperature of the polymer−30)° C. to (glass transition temperature of the polymer+50)° C., more preferably (glass transition temperature of the polymer−20)° C. to (glass transition temperature of the polymer+40)° C.

When the polymer used in the present invention is molten to form a film, a stabilizer such as hindered phenol, acrylate containing a hindered phenol group, benzofuranone or phosphite is added to improve the thermal stability.

Examples of the hindered phenol include Irganox 1010 and 1076 (trade products of Ciba Geigy AG).

Examples of the (meth)acrylate compound containing a hindered phenol group include compounds represented by the following formula (3):

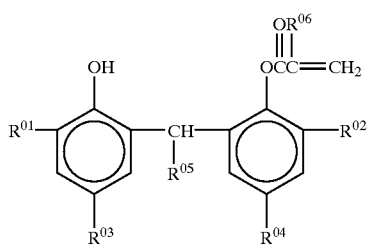

(3)

wherein $R^{01}$ to $R^{05}$ are the same or different and each a hydrogen atom or alkyl group having 1 to 10 carbon atoms, and $R^{06}$ is a hydrogen atom or methyl group.

$R^{01}$ to $R^{05}$ are the same or different and each a hydrogen atom or alkyl group having 1 to 10 carbon atoms, preferably an alkyl group having 1 to 5 carbon atoms. The alkyl group is selected in consideration of an effect as a stabilizer and production ease. Examples of the alkyl group include methyl, ethyl, n-propyl, isopropyl, n-butyl, sec-butyl, isobutyl, tert-butyl and 1,1-dimethylpropyl. $R^{01}$ and $R^{02}$ are particularly preferably a bulky alkyl group which becomes a steric hindrance, such as isopropyl, sec-butyl, tert-butyl or 1,1-dimethylpropyl, as it has a stabilization effect and is easily produced. Out of these, tert-butyl and 1,1-dimethylpropyl are preferred. $R^{03}$ and $R^{04}$ are preferably a methyl group, ethyl group, n-propyl group, isopropyl group, n-butyl group, sec-butyl group, isobutyl group, tert-butyl group or 1,1-dimethylpropyl group from the viewpoint of production ease. In consideration of the formation reaction of a quinoid structure accompanied by the extraction of a hydrogen atom, a tert-butyl group and 1,1-dimethylpropyl group are more preferred. $R^{05}$ is preferably an alkyl which hardly becomes a steric hindrance, such as a methyl group, ethyl group, propyl group or n-butyl group, from the viewpoint of production. $R^{06}$ is a hydrogen atom or methyl group.

Some of the above (meth)acrylate compounds containing a hindered phenol group are marketed under the trade names of Sumirizer GS and Sumirizer GM (of Sumitomo Chemical Co., Ltd.). An acrylate-based compound containing a hindered phenol group is preferably used to produce an optical recording medium using an ultraviolet curable resin because when it is used as a stabilizer, coloring rarely occurs even by exposure to ultraviolet radiation.

An example of the benzofuranone stabilizer is HP136 (trade product of Ciba Geigy AG), and an example of the phosphite stabilizer is Irgafos 168 (trade product of Ciba Geigy AG). Out of these, acrylates containing a hindered phenol group and benzofuranone are preferred.

The above stabilizers may be used alone or in combination of two or more.

The stabilizer is used in an amount of 0.01 to 1 part by weight based on 100 parts by weight of the polymer. When the amount is smaller than 0.01 part by weight, a reduction in the polymerization degree of the polymer becomes marked, thereby making it difficult to obtain a sheet having desired physical properties. When the amount is larger than 1 part by weight, the light transmission of the sheet lowers disadvantageously. Particularly, the amount of the (meth) acrylate compound containing a hindered phenol group is more preferably 0.05 to 0.8 part by weight, much more preferably 0.1 to 0.5 part by weight.

The thus obtained film is stretched in the same manner as in (A1) to obtain an oriented film.

Additives such as a heat resistant stabilizer, lubricant, plasticizer, ultraviolet light absorber and antistatic agent may be further added to the polymer used in the film of the present invention as required in limits that do not impair the transparency of the film.

When the film of the present invention is used as a phase difference film, for example, in a liquid crystal display device, particularly a reflective liquid crystal display device comprising a single polarizing plate, a display device having excellent picture quality can be obtained. This reflective liquid crystal display device is various in structure: one comprising a polarizing plate, phase difference film, substrate with transparent electrodes, liquid crystal layer and substrate with diffusion/reflection electrodes in the mentioned order, one comprising a polarizing plate, diffusion plate, phase difference film, substrate with transparent electrodes, liquid crystal layer and substrate with mirror reflection electrodes in the mentioned order, and one comprising a polarizing plate, phase difference film, substrate with transparent electrodes, liquid crystal layer, substrate with transparent electrodes and reflection layer in the mentioned order. Further, the phase difference film of the present invention may be used in a liquid crystal display device which has both transmission and reflection functions as a quarter wavelength plate. As for the constitution of the liquid crystal display device, it comprises a polarizing plate, phase difference film, substrate with transparent electrodes, liquid crystal layer, substrate with reflection and transmission electrodes, phase difference film, polarizing plate and backlight system. Further, when the film of the present invention is used as an element for converting circularly polarized light into linearly polarized light in a reflection type polarizing plate for reflecting only clockwise or counterclockwise circularly polarized light, which is made from cholesteric liquid crystals, excellent linearly polarized light is obtained at a wide frequency band.

The film of the present invention can be used as a quarter wavelength plate for use in the optical head of an optical recording device. Since the phase difference film can give a phase difference equivalent to ¼ the wavelength to multiple wavelengths, it can contribute to a reduction in the number of phase differences in the optical head using a plurality of laser light sources.

Further, as the film of the present invention is excellent in heat resistance, transparency, optical isotropy, surface hardness and mechanical strength, it can be used as a cover layer for information recording media. More specifically, it can be used as a light transmitting layer for read-only optical disks and optical recording disks. When the film of the present invention is used for this application, the film preferably has a phase difference at R(550) of 30 nm or less, an elongation in at least one direction of 1% or more and a shrinkage factor of more than 1%.

EXAMPLES

The characteristic property values of the materials described in this specification were obtained by the following evaluation methods.
(1) Measurement of R and K Values The phase difference R value which is the product of birefringence Δn and film thickness d and the K value obtained from 3-D refractive index were measured with the M150 spectral ellipsometer of Nippon Bunko Co., Ltd. The R value was measured while incident light and the surface of the film crossed each other and expressed by R=Δn·d= (nx−ny)·d. The K value was obtained by measuring phase difference values at each angle by changing the angle between incident light and the surface of the film, obtaining nx, ny and nz which are 3-D refractive indices by curve fitting a known index ellipsoid expression and inserting them into the expression K=(nz−(nx+ny)/2)·d. Although an average refractive index n=(nx+ny+nz)/3 is required as another parameter, refractive indices n at wavelengths λ of 500, 550, 590 and 640 nm were measured using the Abbe's refractometer 2-T of Atago Co., Ltd. which is an Abbe's refractometer equipped with a spectral light source to obtain refractive indices at other wavelengths using a Cauchy's formula (n=a+b/λ2+c/λ4; a, b and c are fitting parameters) from the four indices. Unites of the K value and the R value are nm. nx, ny and nz are defined as follows.

nx: refractive index in the main stretching direction on the film plane ny: refractive index in a direction perpendicular to the main stretching direction on the film plane nz: refractive index in a direction normal to the surface of the film.

(2) Measurement of Total Light Transmission

This was measured with an integrating sphere type transmission measuring instrument in accordance with the "Method of Testing Optical Properties of Plastics" specified in JIS K 7135. The color difference and turbidity measuring instrument (COH-300A) of Nippon Denshoku Kogyo Co., Ltd. was used as an evaluation device.

(3) Measurement of Water Absorption

This was measured in accordance with the "Method of Testing Water Absorption and Boiling Water Absorption of Plastics" specified in JIS K 7209 except that the thickness of a dried film was set to 130±50 μm. The test sample was 50 mm square and immersed in water heated at 25° C. for 24 hours to measure a change in weight. The unit is %.

(4) Glass Transition Temperature (Tg)

This was measured with the 2920 DSC of TA Instruments Co., Ltd. at a temperature elevation rate of 20° C./min.

(5) Reduced Viscosity

The reduced viscosity $\eta_{sp}/c$ was measured at 30° C. in a toluene solution having a concentration of 0.5 g/dL.

(6) Hydrogenation Factor

This was determined by $^1$H-NMR measurement using the JNM-A 400 nuclear magnetic resonance absorption device of JEOL.

(7) Light Transmission at 400 nm

The light transmission of the film at 400 nm was measured with the U-3200 SPECTROPHOTOMETER of Hitachi, Ltd.

(8) Content of Alicyclic Hydrocarbon Group (wt %)

This was calculated from the content of isoprene and the molecular weights of a raw material comprising an alicyclic group formed by hydrogenation and a hydrogenated product.

(9) UV Irradiation

Ultraviolet radiation having an intensity of 60 mW/cm$^2$ was irradiated for 10 seconds using the P150 ultraviolet curing coater of Fusion Systems Co., Ltd.

Example 1

400 parts by weight of polystyrene (Mw=280,000) and 2,200 parts by weight of cyclohexane were charged into a stainless steel autoclave. They were stirred at 60° C. for 2 hours to prepare a polymer solution, and 700 parts by weight of methyl t-butyl ether and 80 parts by weight of a Ni/silica.alumina catalyst (65 wt % of Ni carried) were added to the solution to carry out a hydrogenation reaction at a hydrogen pressure of 100 kg/cm$^2$ and a temperature of 180° C. for 5 hours. After the temperature was returned to room temperature and the inside of the autoclave was fully substituted with nitrogen, the solution was taken out from the autoclave and filtered under pressure using a membrane filter having a pore diameter of 0.1 μm (Fluoropore of Sumitomo Electric Industries, Ltd.) to obtain an achromatic transparent polymer solution. Sumirizer GS (of Sumitomo Chemical Co., Ltd.) was added as a stabilizer in an amount of 0.3 wt % based on the polymer, and the solvent was distilled off by vacuum concentration and flushing to obtain a solid achromatic and transparent hydrogenated polystyrene polymer. The polymer had a hydrogenation factor measured by $^1$H-NMR analysis of 99.9 mol %, an alicyclic hydrocarbon group content of 75.5 wt %, a reduced viscosity $\eta_{sp}/c$ measured at 30° C. in a 0.5 g/dL toluene solution of 0.50 dL/g and a glass transition temperature measured by DSC of 150° C.

This polymer was melt extruded at 260° C. and cast on a drum maintained at 160° C. to obtain a 270 μm-thick unstretched film. The obtained film was stretched to 2 times in a uniaxial direction at 145° C. to obtain an oriented film. The thickness, phase difference (retardation) at 550 nm, R(450)/R(550), R(650)/R(550), total light transmission and water absorption of the oriented film are shown in Table 1.

When the transmission at 400 nm of the film was measured, it was 87%. When the transmission at 400 nm of the film was measured after UV exposure, it was 86%.

Example 2

An unstretched film obtained in the same manner as in Example 1 was stretched to 3 times in a uniaxial direction at 145° C. to obtain an oriented film. The thickness, phase difference (retardation) at 550 nm, R(450)/R(550), R(650)/R(550), total light transmission and water absorption of the oriented film are shown in Table 1.

Example 3

An unstretched film obtained in the same manner as in Example 1 was stretched to 3 times in a uniaxial direction at 170° C. to obtain an oriented film. The thickness, phase difference (retardation) at 550 nm, R(450)/R(550), R(650)/R(550), total light transmission and water absorption of the oriented film are shown in Table 1.

Example 4

After the inside of a stainless steel autoclave was fully dried and substituted with nitrogen, 146 parts by weight of styrene and 1,358 parts by weight of dehydrated cyclohexane were charged into the autoclave. Subsequently, a 1.57 M cyclohexane solution containing 1.55 mmol of n-butyllithium was added to the autoclave to start polymerization. After styrene was completely reacted by stirring at 50° C. for 2 hours, a solution consisting of 28 parts by weight of isoprene and 70 parts by weight of cyclohexane was added to further carry out the reaction at 50° C. for 2 hours. Thereafter, a solution consisting of 92 parts by weight of styrene and 705 parts by weight of cyclohexane was further added to carry out the reaction at 50° C. for 2 hours. 2 parts by weight of isopropanol was then added to terminate the reaction.

The hydrogenation reaction of this copolymer solution was carried out in the same manner as in Example 1 except that the hydrogenation reaction time was changed to 4 hours. After the temperature was returned to room temperature and the inside of the autoclave was fully substituted with nitrogen, the solution was taken out from the autoclave and filtered under pressure using a membrane filter having a pore diameter of 0.1 μm (Fluoropore of Sumitomo Electric Industries, Ltd.) to obtain an achromatic transparent polymer solution. Sumirizer GS (of Sumitomo Chemical Co., Ltd.) was added as a stabilizer in an amount of 0.3 wt % based on the polymer, and the solvent was distilled off by vacuum concentration and flushing to obtain a solid achromatic and transparent hydrogenated polystyrene polymer. It was found by the $^1$H-NMR analysis of the copolymer before and after hydrogenation that the polymer had an isoprene content of 9.9 wt %, a hydrogenation factor of 99.9 mol % and an alicyclic hydrocarbon group content of 68.2 wt %. The hydrogenated copolymer had a reduced viscosity $\eta_{sp}/c$ measured at 30° C. in a 0.5 g/dL toluene solution of 0.65 dL/g and a glass transition temperature measured by DSC of 144° C.

This copolymer was melt extruded at 260° C. and cast on a drum maintained at 160° C. to obtain a 150 μm-thick unstretched film. The obtained film was stretched to 1.5 times in a uniaxial direction at 140° C. to obtain an oriented film. The thickness, phase difference (retardation) at 550 nm, R(450)/R(550), R(650)/R(550), total light transmission and water absorption of the oriented film are shown in Table 1.

Example 5

A hydrogenated triblock copolymer was obtained in the same manner as in Example 4 except that the amounts of styrene and cyclohexane initially charged were changed to 181 parts by weight and 1,250 parts by weight, respectively, the amount of n-butyllithium was changed to 2.30 mmol, the amounts of isoprene and cyclohexane added next were changed to 29 parts by weight and 60 parts by weight, respectively, and the amounts of styrene and cyclohexane added next were changed to 170 parts by weight and 630 parts by weight, respectively. As for the composition and physical properties of the copolymer measured under the same conditions as in Example 4, the copolymer had an isoprene content of 7.0 wt %, a hydrogenation factor after a hydrogenation reaction of 99.9 mol %, an alicyclic hydrocarbon group content of 70.3 wt %, a reduced viscosity $\eta_{sp}/c$ of 0.48 dL/g and a glass transition temperature of 144° C.

This copolymer was melt extruded at 260° C. and cast on a drum maintained at 160° C. to obtain a 260 μm-thick unstretched film. The obtained film was stretched to 4 times in a uniaxial direction at 140° C. to obtain an oriented film. The thickness, phase difference (retardation) at 550 nm, R(450)/R(550), R(650)/R(550), total light transmission and water absorption of the oriented film are shown in Table 2.

Example 6

A hydrogenated triblock copolymer was obtained in the same manner as in Example 4 except that the amounts of styrene and cyclohexane initially charged were changed to 173 parts by weight and 1,055 parts by weight, respectively, the amount of n-butyllithium was changed to 2.30 mmol, the amounts of isoprene and cyclohexane added next were changed to 21 parts by weight and 65 parts by weight, respectively, and the amounts of styrene and cyclohexane added next were changed to 186 parts by weight and 880 parts by weight, respectively. As for the composition and physical properties of the copolymer measured under the same conditions as in Example 4, the copolymer had an isoprene content of 5.0 wt %, a hydrogenation factor after a hydrogenation reaction of 99.9 mol %, an alicyclic hydrocarbon group content of 71.8 wt %, a reduced viscosity $\eta_{sp}/c$ of 0.48 dL/g and a glass transition temperature of 147° C.

This copolymer was melt extruded at 260° C. and cast on a drum maintained at 160° C. to obtain a 250 μm-thick unstretched film. The obtained film was stretched to 4 times in a uniaxial direction at 140° C. to obtain an oriented film. The thickness, phase difference (retardation) at 550 nm, R(450)/R(550), R(650)/R(550), total light transmission and water absorption of the oriented film are shown in Table 2.

Example 7

After the inside of a stainless steel autoclave was fully dried and substituted with nitrogen, 320 parts by weight of styrene, 1,600 parts by weight of dehydrated cyclohexane and 0.255 part by weight of potassium-t-butoxide were charged into the autoclave. Subsequently, a 1.57 M cyclohexane solution containing 2.36 mmol of n-butyllithium was added to the autoclave to start polymerization. After styrene was completely reacted by stirring at 40° C. for 1 hour, 0.7 part by weight of isopropanol was added to terminate the reaction. The obtained polystyrene had an isotactic dyad of 76%. The isotactic dyad was calculated by dissolving the polymer in orthodichlorobenzene-d4 and measuring $^{13}$C-NMR at 140° C. in accordance with Maclomol. Chem., vol. 156, pp. 256, 1972 of Inoue et al.

The hydrogenation reaction of this polymer solution was carried out in the same manner as in Example 1. After the temperature was returned to normal temperature and the inside of the autoclave was fully substituted with nitrogen, the solution was taken out from the autoclave and filtered under pressure using a membrane filter having a pore diameter of 0.1 μm (Fluoropore of Sumitomo Electric Industries, Ltd.) to obtain an achromatic transparent polymer solution. Sumirizer GS (of Sumitomo Chemical Co., Ltd.) was added as a stabilizer in an amount of 0.3 wt % based on the polymer, and the solvent was distilled off by vacuum concentration and flushing to obtain solid achromatic and transparent hydrogenated isotactic polystyrene. The obtained hydrogenated isotactic polystyrene had a hydrogenation factor of 99.9 mol %, an alicyclic hydrocarbon group content of 75.5 wt %, a reduced viscosity $\eta_{sp}/c$ of 0.58 dL/g and a glass transition temperature of 140° C.

This polymer was dissolved in cyclohexane to obtain a 20 wt % solution. This solution was cast on a glass plate using a doctor knife and the solvent was gradually dried in a hot air drier to form a 100 μm-thick unstretched film. The obtained film was stretched to 3.5 times in a uniaxial direction at 140° C. to obtain an oriented film. The thickness, phase difference (retardation) at 550 nm, R(450)/R(550), R(650)/R(550), total light transmission and water absorption of the oriented film are shown in Table 2.

TABLE 1

|  | Ex.1 | Ex.2 | Ex.3 | Ex.4 |
| --- | --- | --- | --- | --- |
| thickness (μpm) | 128 | 93 | 130 | 108 |
| phase difference at 550 nm (nm) | 83 | 91 | 10 | 21 |
| R(450)/R(550) | 0.93 | 0.93 | 0.94 | 0.82 |
| R(650)/R(550) | 1.04 | 1.04 | 1.04 | 1.10 |
| K(450)/K(550) | 1.00 | 0.90 | — | — |
| K(650)/K(550) | 0.98 | 1.05 | — | — |
| total light transmission (%) | 92 | 92 | 92 | 92 |
| water absorption (%) | <0.01 | <0.01 | <0.01 | <0.01 |

Ex.: Example

TABLE 2

|  | Ex.5 | Ex.6 | Ex.7 |
|---|---|---|---|
| thickness (μm) | 103 | 97 | 52 |
| phase difference at 550 nm (nm) | 62 | 72 | 72 |
| R(450)/R(550) | 0.89 | 0.90 | 0.98 |
| R(650)/R(550) | 1.06 | 1.06 | 1.01 |
| K(450)/K(550) | — | — | — |
| K(650)/K(550) | — | — | — |
| total light transmission (%) | 92 | 92 | 92 |
| water absorption (%) | <0.01 | <0.01 | <0.01 |

Ex.: Example

Example 8

500 g of a polystyrene homopolymer (of BASF Co., Ltd., Type158K, weight average molecular weight: 280,000) was dissolved in a mixed solvent consisting of 2,400 g of cyclohexane and 1,600 g of methyl t-butyl ether in a 10-liter stainless steel autoclave, and 140 g of a Ni/silica•alumina catalyst (65 wt % of Ni carried) was charged to carry out a hydrogenation reaction at a hydrogen pressure of 100 kg/cm$^2$ and a temperature of 180° C. for 6 hours. After the temperature was returned to normal temperature and the inside of the autoclave was fully substituted with nitrogen, the solution was taken out from the autoclave and filtered under pressure using a membrane filter having a pore diameter of 0.1 μm (Fluoropore of Sumitomo Electric Industries, Ltd.) to obtain an achromatic transparent polymer solution.

Irganox 1010 (of Ciba Geigy AG) was added to this solution as a stabilizer in an amount of 0.5 wt % based on the polymer, and the solvent was distilled off by vacuum concentration and flushing to obtain a solid achromatic and transparent hydrogenated polystyrene polymer. The obtained polymer had a reduced viscosity $\eta_{sp}/c$ of 0.50 dL/g and a hydrogenation factor measured by $^1$H-NMR of 99% or more. The glass transition temperature measured by DSC was 150° C.

A 30% cyclohexane solution of the obtained polymer was prepared, and a film was formed by casting using a 300 μm doctor blade and dried at room temperature. After the film was fully left as it was to remove the solvent, the film had a glass transition temperature measured by DSC of 80° C. This film was stretched biaxially to 3×3 times simultaneously at 100° C. and heat set with a fixed length at 130° C. for 3 hours. The total light transmission, light transmission at 400 nm, glass transition temperature, strength, elongation, shrinkage factor, retardation (R) at 550 nm and refractive index difference between a direction on the plane and in a direction normal to the plane of the obtained film are shown in Table 3.

Example 9

After the inside of a 5-liter stainless steel autoclave was fully dried and substituted with nitrogen, 1,695 g of cyclohexane and 142 g of styrene were charged into the autoclave. Subsequently, a 1.57 M cyclohexane solution containing 2.8 mmol of n-butyllithium was added to the autoclave to start polymerization. After styrene was completely reacted by stirring at 45° C. for 2 hours, 31.5 g of isoprene was added to continue the reaction at 48° C. for 2 hours. Thereafter, 139 g of styrene was added and the temperature was raised to 55° C. to further carry out the reaction, and 0.17 g of 2-propanol was added after 2 hours.

The obtained solution was transferred to a 10-liter stainless steel autoclave, and 1,455 g of cyclohexane, 530 g of methyl t-butyl ether and 50 g of a Ni/silica•alumina catalyst (65 wt % of Ni carried) were added to carry out a hydrogenation reaction at a hydrogen pressure of 100 kg/cm$^2$ and a temperature of 190° C. for 4 hours. After the temperature was returned to normal temperature and the inside of the autoclave was fully substituted with nitrogen, the solution was taken out from the autoclave and filtered under pressure using a membrane filter having a pore diameter of 0.1 μm (Fluoropore of Sumitomo Electric Industries, Ltd.) to obtain an achromatic transparent solution. The solvent was distilled off by vacuum concentration and flushing to obtain a solid achromatic and transparent hydrogenated styrene-isoprene copolymer. It was found by the $^1$H-NMR analysis of the copolymer before and after hydrogenation that the obtained polymer had an isoprene content of 9.0 wt %, a hydrogenation factor of 99.9 mol % and an alicyclic hydrocarbon group content of 68.8 wt %. The polymer had a reduced viscosity $\eta_{sp}/c$ measured at 30° C. in a 0.5 g/dL toluene solution of 0.46 dL/g. When the hydrogenation factor was measured by $^1$H-NMR, it was 100% in the detection limit. The glass transition temperature measured by DSC was 146° C.

A 30% cyclohexane solution of the obtained polymer was prepared, and a film was formed by casting using a 300 μm doctor blade and dried at room temperature. After the film was fully left as it was to remove the solvent, the obtained film had a glass transition temperature measured by DSC of 82° C. This film was stretched biaxially to 3×3 times simultaneously at 100° C. and heat set with a fixed length at 130° C. for 3 hours. The results are shown in Table 3.

Example 10

The polymer obtained in Example 8 was molten at 260° C. and cast on a drum maintained at 160° C. to obtain an unstretched film. The obtained film was stretched to 4 times in a uniaxial direction at 170° C. The light transmission, glass transition temperature, strength in the stretching direction, elongation, shrinkage factor, retardation (R) at 550 nm and refractive index difference between a direction on the plane and in a direction normal to the plane of the obtained film are shown in Table 3.

TABLE 3

|  | Ex.8 | Ex.9 | Ex.10 |
|---|---|---|---|
| thickness (μm) | 14 | 13 | 105 |
| phase difference at 550 nm (nm) | 0.7 | 0.15 | 9.5 |
| R(450)/R(550) | 0.95 | 0.83 | 0.94 |
| R(650)/R(550) | 1.03 | 1.17 | 1.04 |
| total light transmission (%) | 92 | 91 | 92 |
| transmission at 400 nm (%) | 89 | 87 | 88 |
| tensile strength (Mpa) | 38 | 49 | 39 |
| elongation (%) < 50 | 1.7 | 5.2 | 3.3 |
| shrinkage factor > 1% at Tg | 2 | 1.7 | 2.3 |
| Tg | 151 | 145 | 150 |
| refractive index difference | 0.00025 | 0.00032 | 0.00009 |

Ex.: Example

What is claimed is:

1. A film which comprises a polymer having such a structure that the main chain thereof consists of a hydrocarbon skeleton and some of the hydrogen atoms of the hydrocarbon skeleton are substituted by at least one alicyclic group selected from the group consisting of an alicyclic hydrocarbon group having a 4 or more membered ring and an alicyclic heterocyclic group, the amount of the alicyclic group being 60 to 90 wt %, and which satisfies the following formula (A):

$$R(450)/R(550)<1 \tag{A}$$

wherein R(450) and R(5 50) are phase differences on the film plane at a wavelength of 450 nm and a wavelength of 550 nm, respectively; wherein the polymer consists of a recurring unit represented by the following formula (1):

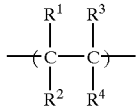
(1)

wherein $R^1$, $R^2$, $R^3$ and $R^4$ are the same or different and each being a hydrogen atom, aliphatic group having 1 to 10 carbon atoms or alicyclic group having a 4 or more membered ring, with the proviso that at least one of $R^1$, $R^2$, $R^3$ and $R^4$ is an alicyclic group having a 4 or more membered ring; and optionally a recurring unit represented by the following formula (2):

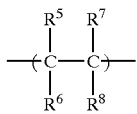
(2)

wherein $R^5$, $R^6$, $R^7$ and $R^8$ are the same or different and each a hydrogen atom, aliphatic group having 1 to 10 carbon atoms or aromatic group having 6 to 12 carbon atoms.

2. The film of claim 1, wherein 8 to 50 mol % of all the hydrogen atoms of the hydrocarbon skeleton of the main chain of the polymer are substituted by an alicyclic group.

3. The film of claim 1, wherein the alicyclic group has a 4- to 7-membered ring.

4. The film of claim 1, wherein the polymer is a copolymer consisting of a recurring unit represented by the following formula (1):

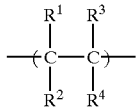
(1)

wherein $R^1$, $R^2$, $R^3$ and $R^4$ are the same or different and each a hydrogen atom, aliphatic group having 1 to 10 carbon atoms or alicyclic group having a 4 or more membered ring, with the proviso that at least one of $R^1$, $R^2$, $R^3$ and $R^4$ is an alicyclic group having a 4 or more membered ring, and a recurring unit represented by the following formula (2):

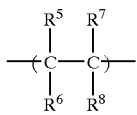
(2)

wherein $R^5$, $R^6$, $R^7$ and $R^8$ are the same or different and each a hydrogen atom, aliphatic group having 1 to 10 carbon atoms or aromatic group having 6 to 12 carbon atoms.

5. The film of claim 1, wherein the polymer is a polymer consisting of a recurring unit represented by formula (1):

wherein $R^1$, $R^2$, $R^3$ and $R^4$ are the same or different and each a hydrogen atom, aliphatic group having 1 to 10 carbon atoms or alicyclic group having a 4 or more membered ring, with the proviso that at least one of $R^1$, $R^2$, $R^3$ and $R^4$ is an alicyclic group having a 4 or more membered ring.

6. The film of claim 1 or 4, wherein the polymer is a hydrogenated product of a block copolymer consisting of a (styrene polymer) block and a (polyconjugated diene) block.

7. The film of claim 1 or 5, wherein the polymer is a hydrogenated product of a styrene polymer.

8. The film of claim 1 which has a light transmission of 85% or more.

9. The film of claim 1 which has an elongation at 25° C. of 1 to 50%.

10. The film of claim 1 which has a thickness of 3 to 300 μm.

11. The film of claim 1 which is a phase difference film.

12. The film of claim 11 which is a λ/4 film.

13. The film of claim 11 which is a λ/2 film.

14. The film of claim 1 which is a phase difference film for liquid crystal display devices.

15. The film of claim 1 which is a cover layer for information recording media.

16. The film of claim 11 which has a phase difference of 50 nm or more.

17. The film of claim 15 which has a phase difference of 30 nm or less.

18. The film of claim 15 which satisfies the following expression (B):

$$K(450)/K(550)<1 \quad (B)$$

wherein K(450) and K(550) are K values at a wavelength of 450 nm and a wavelength of 550 nm, respectively, the K values being represented by the following expression:

$$K=(nz-(nx+ny)/2)\times d$$

wherein nx is a refractive index in a mechanical axis direction on the film plane, ny is a refractive index in a direction perpendicular to the mechanical axis direction on the film plane and nz is a refractive index in a direction normal to the film plane, and d is a film thickness (nm).

19. The film of claim 15 which has an elongation of 1% or more and a shrinkage factor of more than 1% in at least one direction.

* * * * *